United States Patent [19]

Bouygues et al.

[11] 4,139,260

[45] Feb. 13, 1979

[54] OPTICAL FIBERS BUNDLES CONNECTOR

[75] Inventors: Jean Bouygues; Jacques Dubos; André Jacques, all of Paris, France

[73] Assignee: Thomson-CSF, Paris, France

[21] Appl. No.: 873,968

[22] Filed: Jan. 31, 1978

Related U.S. Application Data

[63] Continuation of Ser. No. 670,072, Mar. 24, 1976, abandoned.

[30] Foreign Application Priority Data

Mar. 28, 1975 [FR] France .................. 75 09919

[51] Int. Cl.$^2$ .............................................. G02B 5/14
[52] U.S. Cl. .................................................. 350/96.22
[58] Field of Search ................ 350/96.22, 96.20, 96.16

[56] References Cited

U.S. PATENT DOCUMENTS

| | | | |
|---|---|---|---|
| 3,455,625 | 7/1969 | Brumley et al. .................. | 350/96.22 |
| 3,803,409 | 4/1974 | Prochazka ........................ | 350/96.22 |
| 3,825,320 | 7/1974 | Redfern ............................ | 350/96.22 |
| 3,904,269 | 9/1975 | Lebduska et al. ................ | 350/96.22 |
| 3,914,015 | 10/1975 | McCartney ....................... | 350/96.22 |
| 3,963,323 | 6/1976 | Arnold ............................. | 350/96.22 |

*Primary Examiner*—John K. Corbin
*Assistant Examiner*—Rolf Hille
*Attorney, Agent, or Firm*—Cushman, Darby & Cushman

[57] ABSTRACT

This invention provides an optical fibers bundles connector comprising a male member and a female member which can be plugged into one another. In one of these members is included a single fiber of the same diameter as the bundles which are to be connected, which distributes the luminous flux issuing from the emitter bundle to the receiver bundle. An embodiment having the external dimensions of "Socapex 072 NX 65" electrical connectors is specially described.

9 Claims, 2 Drawing Figures

OPTICAL FIBERS BUNDLES CONNECTOR

This is a continuation of application Ser. No. 670,072 filed Mar. 24, 1976, now abandoned.

FIELD OF THE INVENTION

The present invention relates to a connector for a bundle of optical fibers which can be used in optical telecommunications. It relates more particularly to connectors of this type which comprise a male element and a female element which can be plugged together, each of these two elements respectively doing duty as ferrules for the two fibers bundles which are to be connected together.

BACKGROUND OF THE INVENTION

Optical fibers are generally cylindrical structures designed to transmit light along undulating trajectories; the light radiation propagates there by a series of total reflections or refractions which occur at the region separating the core of the fiber, which has a high reflective index, from its periphery which has a low refractive index. Rather than using a single fiber, it is often preferable to replace this by a bundle of fibers having the same overall diameter: the bundle is more flexible and less fragile than a single fiber and a break in one of the individual fibers does not bring about the total interruption of transmission. Bundles of this kind are generally constituted by several tens of strands each having a diameter of around 50 microns, assembled in mutual contact within a plastic sheath which lends the system mechanical protection. The bundle typically has a diameter of the order of half a millimeter in the bare state and of the order of two millimeters when sheathed.

The creation of detachable connections between bundles of fibers of this kind, nevertheless gives rise to problems of a tricky nature if the luminous flux losses are to be reduced to the minimum value. Direct contact between the entry and exit apertures of the fibers is out of the question because rapid deterioration in the surfaces occurs with successive dismantling and reassembly. On the other hand, the light beam coming from a narrow aperture thus exhibiting substantial divergency, the apertures must be arranged as close as possible to one another to avoid the interposition of a condenser lens between them. It is highly desirable, furthermore, in particular in the field of telecommunications, to utilise plug-in connectors of small size of a kind similar to those used in electrical connections.

To this end, it has been proposed that connection between two fiber bundles should be established by equipping the ends of these bundles with a ferrule of the same kind, comprising for example a female mechanical component; the connector proper is then constituted by an intermediate rigid component with two ferrules, (male elements in the chosen example, which penetrate into the aforesaid female ferrules) attached to the ends of a single fiber having the same diameter as that of the bundles which are to be connected. The single fiber mixes the luminous fluxes coming from the individual fibers in the emitter bundle and transmits a substantially uniform luminous flux to the apertures of the fiber constituting the receiver bundle.

This kind of connector has numerous advantages. It is much less bulky than devices which utilise convergent optical system. The efficiency of the connection does not depend upon the mutual angular positions of the two bundles as it occurs when the two bundles are arranged directly end to end (the most unfavourable position then being that in which the centers of the apertures of the emitter fibers coincide with the dead spaces between the apertures of the receiver fibers). Furthermore, in the case where the two bundles contain defective fibers, the undamaged fibers of the receiver bundle whose apertures are located opposite those of defective fibers in the emitter bundle are able to participate in the transmission function, which would not be possible with bundles directly arranged end to end.

However, if compared with the connections utilised in conventional electrical transmission arrangements, this solution has the drawback that an intermediate component which, because of its small dimensions, can be easily lost is required to connect the bundles.

SUMMARY OF THE INVENTION

It is, therefore, an object of the present invention to provide a connector for two bundles of optical fibers.

It is another object of the invention to provide such a connector which simply comprises a male and a female ferrule plugging directly into one another without intermediate component.

It is a further object of the invention to provide such a connector incorporating a mixing single fiber in the structure of one of said male or female ferrules.

BRIEF DESCRIPTION OF THE DRAWING

This invention, together with its features, advantages and objects can be better understood from the following detailed description when read in conjunction with the attached drawing, in which.

DETAILED DESCRIPTION OF THE PREFERRED EMBODIMENTS

Figure 1:
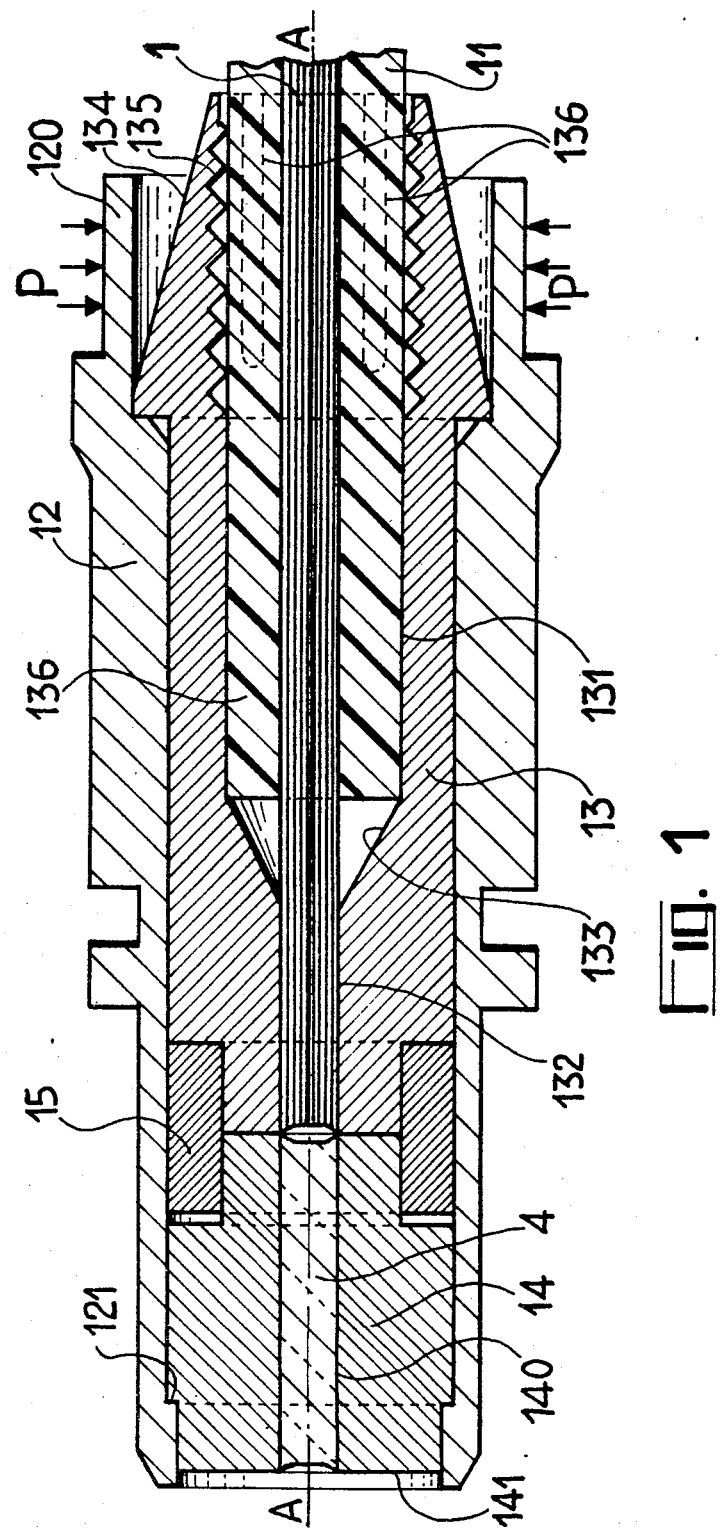
FIG. 1 is a sectional side-elevational view of the male component containing the single fiber of the connector according to the present invention.
Figure 2:
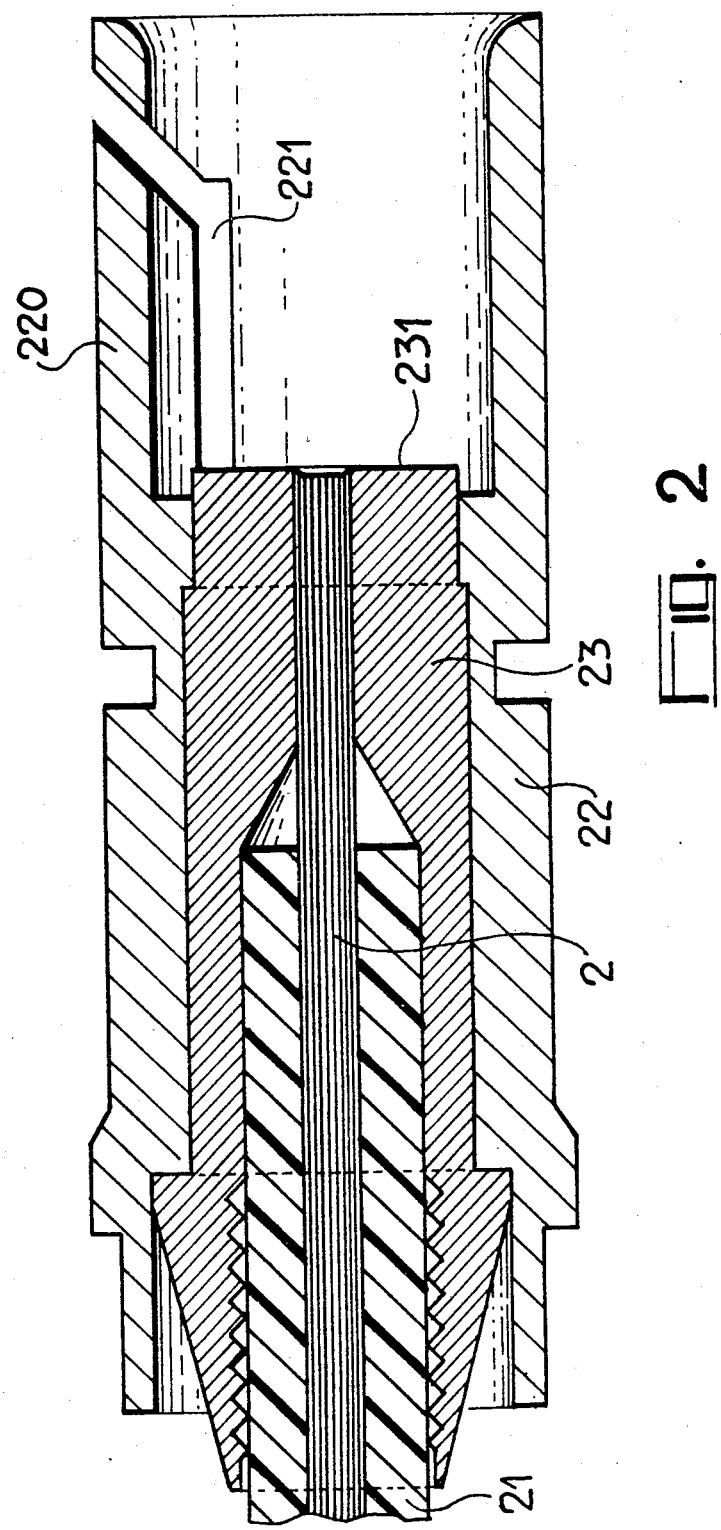
FIG. 2 is a sectional side elevational view of the female component of the connector according to the present invention.

FIGS. 1 and 2 respectively represent the two parts, male and female, of the connector in accordance with the invention, arranged at the ends of two fiber bundles which are to be connected. In this embodiment, intended for "PILKINGTON" bundles with 61 fibers each, the internal parts of the connector have been designed for fitting inside external parts belonging to "SOCAPEX model 672, NX 65" electrical connector. As proposed in accordance with the invention, this shows the perfect match in application between this kind of connector for optical fibers and the conventional connectors utilised in electrical work. In view of the dimensioning of the "SOCAPEX" connector, it has been considered preferable in this particular embodiment, to arrange this single fiber equally in either the female component or the male component. In these figures, the various elements which constitute the male or female components have been shown arranged together in the position which they occupy prior to the crimping operation used to definitively assemble the different parts constituting the ferrule both fibers bundles.

In FIG. 1, which illustrates a sectional side-elevational view along the axis of the male component arranged on the bundle of fiber 1 which is bared of its protective sheath 11 at the end, there can be seen an external component 12 and three internal components 13, 14 and 15, all four made of brass.

The external component 12 reproduces the external component of the male "SOCAPEX" connector already referred to. It has rotational symmetry in relation to its axis AA. The rear portion 120 is designed to enable the external component 12 to be crimped to the internal component 13, and the internal component 13 likewise to the sheath 11; the interior of the front portion contains a stop 121.

The internal components 13, 14 and 15 likewise exhibit rotational symmetry about the axis AA and are a push fit inside the external component 12.

The positioning of the bundle 1 on the axis of the external component 12 is obtained through the component 13 which comprises two successive borings 131 and 132 along the axis, and a tapered connecting portion 133; the boring 131 has a sufficiently large diameter to enable the sheath 11 to be introduced into it. The boring 132 has a diameter just sufficient to pass the bundle of fibers 11 when the sheath has been removed from it, the fibers being grouped in a quasi-compact arrangement. The sheath 11 comes up against the entry of the tapered portion 133. The back of the component 13 is provided with the jaw arrangement 134, its interior possessing teeth (which can advantageously be constituted by a screw thread) designed to bite into the sheath 11 at the time of the clamping which occurs following the crimping operation; four grooves 136 creating a cruciform slot arrangement, enable this component to deform at the time of crimping.

The component 14 is designed to place upon the axis of the component 12 the single fiber 4 which has the same diameter as the bundle 1. It is equipped towards the front with a step which comes up against the stop 121 on the component 12. The overall length of this component and therefore of the single fiber 4 which it encloses, depends upon the apertural angle of the light cone emerging from the individual fibers of the bundle 1. A minimum length is used such that the light cone coming from a fibre located at the centre of the aperture of the single fiber, completely covers the opposite aperture.

The component 15 takes the form of a ring which fits without any clearance over the front part of the component 13 and the rear part of the component 14; it ensures that the corresponding apertures of bundle 1 and fiber 4 are positioned stricly opposite one another. The presence of this ring is made necessary by the need to optically polish the respective front and rear faces of the components 13 and 14, which, since these two components have to project, makes it impossible to arrange them in the form of a male component and a female component fitting into one another. The front face of the component 14 is also optically polished.

The mutual ratios of the dimensions of the different elements have been respected in the figure. The true dimensions can therefore be deduced from the true diameter of the fiber bundle, this being 0.5 mm.

The assembly of the aforesaid elements takes place as follows: the sheath 11 is stripped from the bundle 1 over the distance of about 4 mm and then introduced into the component 13 so that it projects slightly beyond the front orifice of the drilling 132. To do this, with the component 13 arranged in a vibrator operating at 50 Hz, the end of the bundle is introduced progressively, through the tapered opening 133, into the drilling 132. When the sheath comes up against the taper, the bundle is cemented in place in the drilling 132 by applying a drop of "STRATYL" varnish to the end of the fibers; the varnish penetrates by capillary action. When the varnish is dry, optical polishing of the front face of the component 13 is carried out. Optical "Araldite" is applied to the single fiber 4, which is then introduced into the drilling 140 of the component 14, and subsequently polymerised at 50° C for a period of 12 hours. This completed, the polishing of the front and rear faces of the component 14 is carried out.

During these polishing operations, the brass which is softer than the glass of which the fibers are made, wears less rapidly than the latter.

In this way, the direct result is achieved that the aperture of the fibers, as FIG. 1 shows, is set back a few hundredths of a millimeter in relation to the flat metal face. This setting back is essential since, when the final positioning of the various components is taking place and also during repeated dismantling and assembly operations between male and female parts of the connector, it ensures that the fiber ends do not rub against each other, something which would otherwise cause rapid detioration.

The components 13 and 14, secured together by the ring 15, are then introduced along the axis of the external component 12 in order to obtain the configuration shown in FIG. 1. Using a pair of crimping pliers to apply a compressive load on the part 120 of the component 12 in the direction of the arrows p, this component is deformed and bears against the jaw arrangement 134, deforming it in its turn and driving the teeth into the sheath 11. The tapered external shape of the jaw arrangement 134 means that at the time of crimping a resultant force is developed parallel to the axis AA, which causes the component 14 to bear against the stop 121 and the component 13 against the component 14.

FIG. 2 illustrates a sectional view along the axis of the female part of the conductor, this latter part being assembled on the end of a second bundle 2 from which the sheath 21 has been partially stripped and which comprises an external portion 22 and an internal portion 23. As in the case of the male part, these components are rotationally symmetrical about an axis AA.

The external component 22 is identical to the external component of the female "SOCAPEX" connector referred to earlier. It comprises a front portion 220 (at the end opposite to that at which the fiber enters) which is hollow, forming a location into which the front portion of the male part can be introduced. A slot 221 imparts a certain degree of elasticity to this location. The internal part 23, designed to position the bundle of fibers 2 on the axis of the external part 22, comprises exactly the same elements as the component 13 shown in FIG. 1.

The assembly of the bundle 23, the polishing of the front face of the component 23, the assembly of the component 23 in that 22 and the crimping of the assembly, are carried out using a procedure exactly similar to that which has been described already in relation to the assembly of the male part.

The dimensions of the external component 12 of FIG. 1 and that 22 of FIG. 3, are designed in such a manner that when the male part has been inserted into the male part until it bottoms, it is the flat, optically polished parts 141 of FIG. 1 and 231 of FIG. 2, which come up against one another; the apertures of the single fiber and the fibers bundle, are then opposite one another and the end of the bundle 1 and the single fiber 4 of the end of the bundle 2 are in alignment with each other. As explained earlier, the apertures of the fiber 4 of FIG. 1, on the one hand, and the fibers which make up the bundle 2 of FIG. 2, on the other, being set back in relation to the said flat faces, plug-in and unplugging operations between the two parts of the connector can be effected without damage to the apertures of the fibers and therefore without any progressive degradation in the transmission properties.

One of the advantages of the individual connector described hereinbefore by way of example, is that it can be used in the various miniature connectors, having juxtaposable elements, of the "SOCAPEX" series, with individual connectors having the same external components.

What we claim is:

1. A connector for connecting a first and a second bundle of optical fibers, each of said bundles having a protective sheath, said connector comprising a first and second members capable of being plugged in to one another, one of said member being a male member and the other a female member;

said first and said second member respectively including first and second positioning means for positioning respectively said first and said second bundle inside said first and said second member and first and second mechanical affixing means for affixing said first and said second member to said sheath of respectively said first and said second bundle;

said first member further including a single fiber: third positioning means for positioning said single fiber in alignment with said first bundle and securing means for preventing said third positioning means from escaping out of the front face of said first member;

said single fiber having a diameter at least equal to the diameter of said bundles;

and said second positioning means, when said first and second members are plugged into one another, placing said second bundle in alignment with said single fiber.

2. A connector as claimed in claim 1, wherein said first and second members respectively end with a first and a second flat face, said first and said second flat faces being respectively perpendicular to said single fiber and to said second bundle, said first and second faces being contiguous when said first and second members are plugged into one another.

3. A connector as claimed in claim 2, wherein a first aperture of said single fiber and the aperture of said second bundle being respectively arranged inside said first and second flat faces, said apertures are set back in relation to said first and second flat faces.

4. A connector as claimed in claim 3, wherein said first and second members, exhibiting a rotational symmetry about a symmetry axis, further include respectively a first and a second external body;

said first and third positioning means being inserted into said first external body, positioning the respective axes of said first bundle and said single fiber substantially in coincidence with said symmetry axis and being contiguous through respectively a third and a fourth flat faces; a ring-shaped internal body being further inserted into said first external body and surrounding said first and third positioning means at either side of said third and fourth flat faces; said first flat face being arranged on said third positioning means opposite said third flat face;

and said second positioning means being inserted into said second internal body, said second flat face being arranged at the end of said second positioning means.

5. A connector as claimed in claim 4, wherein said first, second, third and fourth flat faces are optically polished flat faces.

6. A connector as claimed in claim 4, wherein a second aperture of said single fiber and the aperture of said first bundle being respectively arranged inside said third and fourth flat faces, said apertures are set back in relation with said third and fourth flat faces.

7. A connector as claimed in claim 6, wherein the spaces respectively separating said first aperture of said single fiber from the aperture of said second bundle when said first and second members are plugged into one another and said second aperture of said single fiber from the aperture of said first bundle are less than a tenth of the diameter of said bundles.

8. A connector as claimed in claim 4, wherein said first and second positioning means each comprised a first and a second boring, said borings having as axis said symmetry axis, the diameters of said first and second borings being substantially equal to the diameters of said bundles respectively unsheathed and sheathed.

9. A connector as claimed in claim 8, wherein said first and second affixing means respectively comprise a first and a second jaw arrangment, said first and second jaw arrangment respectively terminating said second boring in said first and second positioning means; a crimping operation enabling the rear part of said first and second external bodies to be folded back respectively onto said first and second jaw arrangment and driving said first and second jaw arrangments into the respective sheaths of said first and second bundles.

* * * * *